(12) United States Patent
Deole et al.

(10) Patent No.: US 11,593,767 B2
(45) Date of Patent: Feb. 28, 2023

(54) SYSTEMS AND METHODS FOR PROVIDING ELECTRONIC EVENT ATTENDANCE MODE RECOMMENDATIONS

(71) Applicant: Avaya Management L.P., Durham, NC (US)

(72) Inventors: Pushkar Yashavant Deole, Pune (IN); Sandesh Chopdekar, Pune (IN); Navin Daga, Silapathar (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/461,383

(22) Filed: Aug. 30, 2021

(65) Prior Publication Data

US 2022/0327494 A1 Oct. 13, 2022

Related U.S. Application Data

(63) Continuation-in-part of application No. 17/220,485, filed on Apr. 1, 2021.

(51) Int. Cl.
```
G06Q 10/10      (2012.01)
G06Q 10/1093    (2023.01)
G06F 3/0482     (2013.01)
G06N 3/02       (2006.01)
H04L 12/18      (2006.01)
```
(52) U.S. Cl.
CPC ....... *G06Q 10/1095* (2013.01); *G06F 3/0482* (2013.01); *G06N 3/02* (2013.01); *H04L 12/1818* (2013.01)

(58) Field of Classification Search
CPC .................................................. G06Q 10/1095
See application file for complete search history.

(56) References Cited

U.S. PATENT DOCUMENTS

| | | | |
|---|---|---|---|
| 8,019,069 B1 | 9/2011 | Cyriac et al. | |
| 9,021,118 B2 | 4/2015 | John et al. | |
| 9,112,978 B2 | 8/2015 | Gilbert et al. | |
| 9,112,979 B2 | 8/2015 | Gilbert et al. | |
| 9,253,330 B2 | 2/2016 | Boss et al. | |
| 9,402,104 B2 | 7/2016 | John et al. | |
| 9,774,825 B1 | 9/2017 | John et al. | |
| 2007/0008911 A1 | 1/2007 | MacFarlane et al. | |
| 2009/0083694 A1 | 3/2009 | Argott | |
| 2010/0235216 A1 | 9/2010 | Hehmeyer et al. | |
| 2020/0258029 A1* | 8/2020 | Jung | G06Q 10/06314 |
| 2020/0334642 A1* | 10/2020 | Vaananen | G06N 3/08 |

OTHER PUBLICATIONS

Official Action with machine translation for France Patent Application No. 2202749, dated May 24, 2022 4 pages.
Official Action for U.S. Appl. No. 17/220,485, dated Apr. 13, 2022 13 pages.
Official Action with machine translation for France Patent Application No. 2208447, dated Oct. 11, 2022 6 pages.
Official Action for U.S. Appl. No. 17/220,485, dated Aug. 23, 2022 20 pages.

* cited by examiner

*Primary Examiner* — Roland J Casillas
(74) *Attorney, Agent, or Firm* — Sheridan Ross P.C.

(57) ABSTRACT

Systems and methods include providing a recommendation for an attendance mode for a user to select when invited to an event through a calendaring application. Systems and methods include processing event and user data with a neural network configured to output a recommended attendance mode.

20 Claims, 13 Drawing Sheets

300

Event Settings: Cooking 101                                            X

| New Event | Save | Cancel | Edit Existing Event |

Event Title: Cooking 101
Required Invitees: Ann, David, Diego, Emily    Organizer: Lauren
Optional Invitees: Brooke
Start time: 9 AM, December 21               End time: 2 PM, December 21
Location: The Kitchen

Configuration Settings

Topics Covered:          Set Times
- Setting the table          9am – 9:30am
- Marinating ingredients     9:30am – 10am
- Salad making
- Grilling                   12pm – 1pm
- Desserts                   1pm – 1:30pm
- Serving
- Cleaning up                [Edit]

Keywords
- Cooking    • Pie
- Cleaning   • Place settings
- Chicken    • Vegetables
             • [Edit]

Event Options
✓ Live Transcription
✓ Live Viewing
✓ Live Audio
☐ Saving of Transcription
☐ Saving of Video
☐ Saving of Audio
✓ Partial/Selective Attendance
✓ Avatars

Event Speakers          Speaking Time
Lauren                       12pm – 1pm
Robert
Francis

FIG. 3

Event Invitation: Cooking 101

When: December 21, 9 am – 2 pm
Where: The Kitchen
Organizer: Lauren
Invitees: Ann, Brocke*, David, Diego, Emily

Topics Covered:               Set Times
- Setting the table              9am – 9:30am
- Marinating ingredients         9:30am – 10am
- Salad making
- Grilling                       12pm – 1pm
- Desserts                       1pm – 1:30pm
- Serving
- Cleaning up                    [Edit]

Keywords
- Cooking  • Dessert
- Cleaning • Place settings
- Chicken  • Vegetables
  [Edit]

Potential Conflicts:
Call with Joe 8 am – 8:50 am
Lunch with Jaron: 11:30 am
Workout Class: 2:30 pm

Event Speakers              Speaking Time
Lauren                           12pm – 1pm
Robert
Francis Respond: [ATTEND] [DECLINE] [MAYBE] [PARTIAL/SELECTIVE/REMOTE]

Event Invitation: Cooking 101

When: December 21, 9 am – 2 pm
Where: The Kitchen
Orga...
Invit...

Partial/Selective/Remote Attendance Options ☒

☐ In person attendance
☐ Remote audio only
☐ Remove audio/video
✓ Remote live transcription
☐ Post-meeting audio
✓ Post-event audio/video
☐ Post-event transcription Topics
· Set...
· Ma...
· Sal...
· Gril...
· Des...
· Ser...
· Cle...

Keywo...
· Coo...
· Cle...
· Chicken...

[ Save Choices ]          [ Cancel ]

...ng Time
1pm

Respond: [ATTEND] [DECLINE] [MAYBE] [PARTIAL/SELECTIVE/REMOTE]

Event Invitation: Cooking 101

When: December 21, 9 am – 2 pm
Where: The Kitchen

Recommendations for Conflicting Events

One Conflicting Event Found. See Recommendations Below
- Current Invitation: Attend in person
- Prescheduled Event: Change attendance mode to bot proxy Accept Recommendations    Edit Recommendations ng Time    1pm

FIG. 9B

SYSTEMS AND METHODS FOR PROVIDING ELECTRONIC EVENT ATTENDANCE MODE RECOMMENDATIONS

CROSS REFERENCE TO RELATED APPLICATIONS

This application is a continuation-in-part of U.S. patent application Ser. No. 17/220,485, filed Apr. 1, 2021, the disclosure of which is incorporated herein by reference.

FIELD

The disclosure relates generally to electronic calendaring applications and more particularly to providing recommendations for attendance modes based on electronic calendar event information in a user-friendly manner.

BACKGROUND

As electronic user devices such as smartphones, tablets, computers, etc., become more commonplace, more and more communication between people occurs electronically. The Internet has enabled real-time spread of information.

Using electronic calendar applications, such as Google Calendar™ and Outlook™, users are benefitted with the ability to schedule events for many people with minimal interactions. Calendar items relating to events are created using calendar applications and invitations to such meetings are often sent using email.

With the growing use of calendar applications, events such as office meetings have become simple to schedule. As a result, users such as employees of businesses are increasingly busy with meetings.

Many times, a user may be invited to a meeting in which only a portion of the meeting will likely be beneficial. Such users may sit in a meeting for some time before a discussion which applies to the users begins and the users may be forced to sit quietly for a remainder of a meeting until the meeting officially ends.

The advent of remote viewing has enabled users to be productive until minutes before a meeting begins—as opposed to being required to physically travel to a meeting place. Remote viewing has thus saved many users a great deal of time.

Normally when a meeting invitation is sent using a conventional calendar application, the receiver has three options, i.e., accept, decline, or let the organizer know the receiver may or may not attend the meeting. There are several disadvantages to such a conventional calendar application. For example, if a user wants to join the meeting or event only for a certain topic which will be discussed during the meeting for a short duration, e.g., five to ten minutes, the user cannot adequately respond given the limited choices. This impacts productivity as the user unnecessarily needs to listen to topics, which are of not much use. Other participants who can see that the user accepted may believe that the participant will be in attendance for the entire meeting. Also, the organizer of the meeting may wait for the participant to arrive when in fact the person has no intent of joining the meeting at the beginning.

As should be appreciated, existing solutions to electronic calendaring applications, involving sitting through entire meetings is unproductive. Presently available solutions do not enable users to focus only on relevant topics and provide moderators and others a false impression that each attending user will be in attendance for the meeting resulting in wasted time as a moderator waits for every participant to join at the start of the meeting.

With the ever growing culture of work-from-anywhere, conferencing has become an integral part of professional life. Employees of corporates are spending a significant amount of time participating in virtual audio and/or video conference meetings every day. While there are several advantages of the work-from-home culture and online meetings as compared to office work and in-person meetings, there has been some disadvantages as well. For example, people may suffer from excessive stress and fatigue due to extended meetings, back-to-back meetings, continuous meetings, late night meetings etc. With the ever-increasing number of meetings a person attends, the fatigue just keeps building up. Furthermore, a growing number of regions implement work laws which provide workers a right to remain absent for a particular meeting to be attended in person after office hours.

Because internet-based applications have made inviting people to meetings extremely simple, people are often invited to meetings for which they may not be necessary or for which they may not need to attend the entire meeting. When a user receives an invitation to a meeting or other type of event via his or her calendaring application, the invitation does not adequately reflect whether it is in the user's best interest to attend the meeting or event.

What is needed is an electronic calendar application capable of resolving the above described issues with conventional electronic calendar applications.

BRIEF DESCRIPTION OF THE DRAWINGS

FIGS. 3, 4A, 4B, 4C, 5, and 6 are illustrations of user interfaces in accordance with one or more embodiments of the present disclosure.

FIGS. 9A and 9B are illustrations of user interfaces in accordance with one or more of the disclosed embodiments.

DETAILED DESCRIPTION

Figure 1:
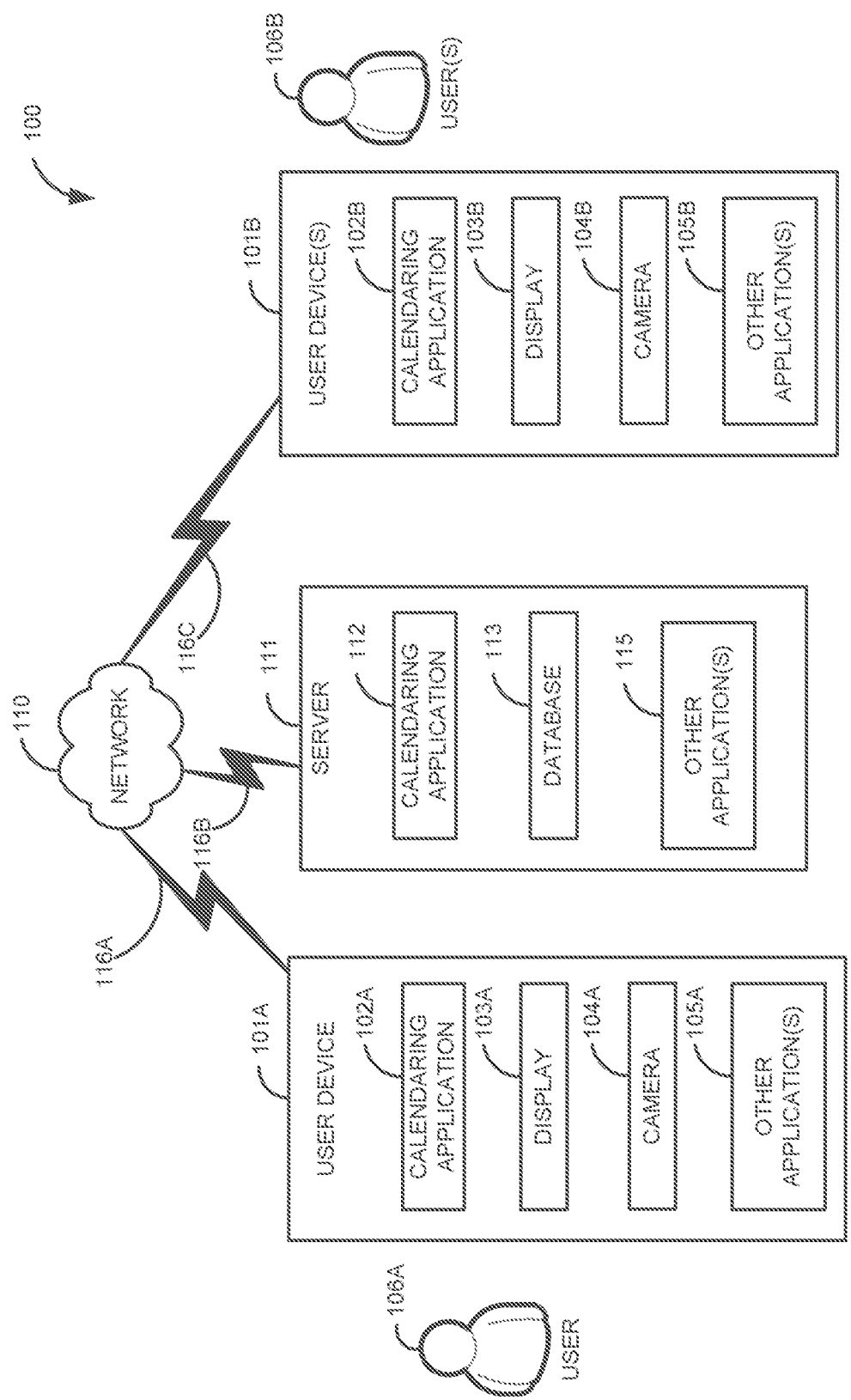
FIG. 1 is a block diagram of a first illustrative system for implementing an electronic calendar application in accordance with one or more embodiments of the present disclosure.

The above discussed issues with contemporary calendar applications and other needs are addressed by the various embodiments and configurations of the present disclosure. As described herein, a calendaring application may enable users to respond to electronic calendar application event invitations in a more intuitive and useful manner. Systems and methods described herein also enable users to attend events organized using electronic calendar applications in a more efficient manner. Such a system as described herein provides a rich experience to users of an electronic calendar application.

The above-described issues with calendaring applications can be addressed in an effective way by providing multiple meeting invite response options including various meeting attendance modes to employees in addition to the ordinary accept, decline, and tentative.

In order to manage the time of a user efficiently and in an effort to reduce stress of user while attending virtual meetings, the system and method described herein may use AI driven analytics about a particular user and past meetings attended by the user to recommend the best possible attendance mode for the user to select from all the available options for a particular meeting invite.

Because an employee may not need to attend a particular meeting at all and can select another type of attendance mode for the meeting such that the user need not be present personally for the meeting, the user may receive, through the use of the systems and methods described herein, a break for the user from the entire duration of meeting or at least some part of meeting where the user is not required to be present.

Users are often incapable or unwilling to determine whether a break is needed to achieve peak performance in their job duties. As a result, an automated method of determining whether the user should avoid a meeting or portions of a meeting as described herein is a tool which may be used to enable users to be more effective as well as healthier. Furthermore, a growing number of regions implement work laws which provide workers a right to remain absent for a particular meeting to be attended in person after office hours.

As described herein, appropriate recommendations may be provided to a particular user about a particular attendance mode that the user should select for a particular meeting by selecting a particular response for meeting invite.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Any combination of one or more computer readable mediums may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

FIG. 1 is a block diagram of a first illustrative system 100 capable of creating electronic calendar items associated with events with calendaring applications, sending electronic invitations, and receiving responses to electronic invitations to organize the flow of data relating to events between one or more users in accordance with one or more of the embodiments described herein. A first illustrative system 100 comprises user communication devices 101A, 101B and a network 110. In addition, users 106A-106B are also shown.

The user communication devices 101A, 101B can be or may include any user device that can communicate on the network 110, such as a Personal Computer ("PC"), a video phone, a video conferencing system, a cellular telephone, a Personal Digital Assistant ("PDA"), a tablet device, a notebook device, a smartphone, and/or the like. Although only two user communication devices 101A, 101B are shown for convenience in FIG. 1, any number of user communication devices 101 may be connected to the network 110 for establishing an event such as a web-conference, video communication, or text-based communications.

The user communication devices 101A, 101B further comprise electronic calendaring applications 102A, 102B, displays 103A, 103B, and cameras 104A, 104B. It should be appreciated that, in some embodiments, user devices may lack cameras 104A, 104B. Also, while not shown for convenience, the user communication devices 101A, 101B typically comprise other elements, such as a microprocessor, a microphone, a browser, other applications, and/or the like.

In addition, the user communication devices 101A, 101B may also comprise other application(s) 105A, 105B. The other application(s) 105A can be any application, such as, a slide presentation application, a document editor application, a document display application, a graphical editing application, a calculator, an email application, a spreadsheet, a multimedia application, a gaming application, and/or the like. The communication applications 102A, 102B can be or may include any hardware/software that can execute an electronic calendar application that is displayed to users 106A or 106B. For example, the communication applications 102A, 102B can be used to execute and display an electronic calendar application.

The displays 103A, 103B can be or may include any hardware display or projection system that can display an image of a video conference, such as a LED display, a plasma display, a projector, a liquid crystal display, a cathode ray tube, and/or the like. The displays 103A-103B can be used to display user interfaces as part of communication applications 102A-102B.

The user communication devices 101A, 101B may also comprise one or more other applications 105A, 105B. The other applications 105A, 105B may work with the electronic calendar applications 102A, 102B.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, video protocol, video protocols, Integrated Services Digital Network (ISDN), and the like. Thus, the network 110 is an electronic communication network configured to carry messages via packets and/or circuit switched communications.

The network may be used by the user devices 101A, 101B, and a server 111 to carry out communication such as interactions using the electronic calendar applications. Data 116A may be sent and/or received via user device 101A, data 116B may be sent and/or received via server 111, and data 116C may be sent and/or received via user device 101B.

The server 111 may comprise any type of computer device that can communicate on the network 110, such as a server, a Personal Computer ("PC"), a video phone, a video conferencing system, a cellular telephone, a Personal Digital Assistant ("PDA"), a tablet device, a notebook device, a smartphone, and/or the like. Although only one server 111 is shown for convenience in FIG. 1, any number of servers 111 may be connected to the network 110 for managing electronic calendar application items.

The server 111 may further comprise an electronic calendar application 112, database(s) 113, other application(s) 115, and, while not shown for convenience, other elements such as a microprocessor, a microphone, a browser application, and/or the like. In some embodiments, machine learning and/or natural language processing algorithms may be executed by the server or other devices to carry out the work of processing event data such as transcribing audio from a live event, while in other embodiments, the server or another device may access one or more third party services provided by, for example, one or more cloud service providers for machine learning and/or audio processing for processing data. In some embodiments, a combination of server-executed artificial intelligence systems and third party-based systems may be used.

Figure 2B:
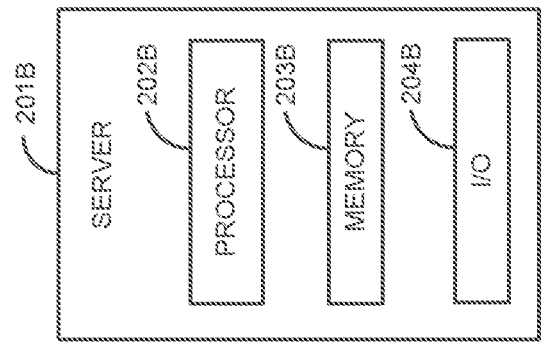
FIG. 2B is a block diagram of a server for executing an electronic calendar application in accordance with one or more embodiments of the present disclosure.
Figure 2A:
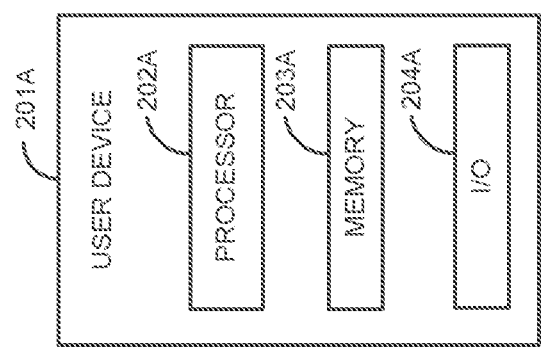
FIG. 2A is a block diagram of a user device system for executing an electronic calendar application in accordance with one or more embodiments of the present disclosure.

FIGS. 2A and 2B illustrate components of an exemplary user device 201A and server 201B for use in certain embodiments as described herein. In some embodiments, a user device 201A may comprise a processor 202A, memory 203A, and input/output devices 204A. Similarly, a server 201B may comprise a processor 202B, memory 203B, and input/output devices 204B.

A processor 202A, 202B may comprise one or more processors and/or microprocessors. As used herein, processor may refer to a plurality of processors and/or microprocessors operating together. Processors 202A, 202B may be capable of executing software and performing steps of methods as described herein. For example, a processor 202A, 202B may be configured to display user interfaces on a display of a computer device. Memory 203A, 203B of a user device 201A, 201B may comprise memory, data storage, or other non-transitory storage device configured with instructions for the operation of the processor 202A, 202B to perform steps described herein. Accordingly, processes may be embodied as machine-readable and machine-executable code for execution by a processor to perform the steps herein and, optionally, other processing tasks. Input/output devices 204A, 204B may comprise, but should not be considered as limited to, keyboards, mice, microphones, cameras, display devices, network cards, etc.

Illustratively, the user communication devices 101A, 101B, the calendar applications, the displays, the application(s), are stored-program-controlled entities, such as a computer or microprocessor, which performs the methods and the processes described herein by executing program instructions stored in a computer-readable storage medium, such as a memory (i.e., a computer memory, a hard disk, and/or the like). Although the methods described herein may be shown in a specific order, one of skill in the art would recognize that the steps of systems and methods described herein may be implemented in different orders and/or be implemented in a multi-threaded environment. Moreover, various steps may be omitted or added based on implementation.

FIG. 3 is an illustration of a user interface 300 for creating an electronic calendar items in accordance with one or more embodiments of the present disclosure. As should be appreciated by the illustration of the user interface 300 of FIG. 3, an event creation user interface may comprise user-interactable graphical user interface ("GUI") elements enabling a user to create an electronic calendar item.

An electronic calendar item may be associated with a physical event such as a meeting. A physical event may be a live group of people or may be a virtual event such as a telephone call, video conference, etc. A physical event may last a particular amount of time, such as five minutes or two weeks. It should be appreciated the systems and methods described herein may be used to organize any type of event.

An electronic calendar item may comprise one or more data packets stored in memory of one or more computing systems. An electronic calendar item may comprise data including, but not limited to, a beginning date and time of an event associated with the electronic calendar item, a title of the event, an ending date and time of the event, an identity of an organizer of the event, a list of invitees for the event, etc.

As illustrated in FIG. 3, an event creation user interface may comprise GUI elements such as buttons and text fields. Using an event creation user interface such as that illustrated in FIG. 3, a user may create an electronic calendar item associated with, for example, a physical or virtual event.

Using the event creation user interface 300 of FIG. 3, a user may enter information such as a start date and time, an end date and time, a list of invitees, and/or other information. Using the user interface 300, a user may set one or more settings associated with the event associated with the electronic calendar item. For example, the user may enable or disable settings such as allowing a live, automatic transcription of audio during the event, allowing remote viewers to spectate and/or participate during the event, allowing the saving of transcriptions, video, and/or audio of the event, and enabling and disabling other features.

Using the user interface 300, a user may be enabled to include one or more tags associated with the event. For example, the user may enter one or more tags describing topics to be discussed during the event. In some embodiments, tags may be associated with a particular time. For example, a user arranging a conference call may tag an introduction section of the call as being the first ten minutes of the call. Tags may be associated with an instance of time, such as ten minutes into the call, or may be associated with a range of time, such as from the beginning of the call until ten minutes.

In some embodiments, an electronic calendar item may include a schedule of topics to be discussed. For example, a user arranging a meeting may list out the topics to be discussed. The topics may be arranged based on an order of discussion. The topics may be associated with times at which the topics will be discussed. For example, a topic may show that the topic will be covered from noon until two pm or for the last fifteen minutes of the event.

In the example illustrated in FIG. 3, an event is being planned. Using an electronic calendaring application, an organizer has begun a process of creating an electronic calendar item associated with the event. The organizer has titled the event Cooking 101. The user interface 300 includes a "new event" button enabling a user to create a new calendar item, a "save" button enabling a user to save the current electronic calendar item, a "cancel" button to cancel the current electronic calendar item, an "edit existing event" to open an existing electronic calendar item and edit one or more attributes of the item.

Item attributes may include, but should not be considered as being limited to, an event title, required invitees, optional invitees, organizers, start time and date, end time and date, location, etc. An event creation user interface 300 may also include user-adjustable configuration. For example, using an event creation user interface 300, a user may input one or more topics to be covered during the event. Topics may or may not be associated with a time or timeframe. An event creation user interface may also include one or more keywords. Keywords may be, for example, words which may be expected to be mentioned during the event associated with the calendar item.

In the example illustrated in FIG. 3, keywords including cooking, cleaning, chicken, pie, place settings, and vegetables have been entered by the organizer. Using the user interface 300, the organizer may be enabled to edit the keywords for the event.

An event creation user interface 300 may include one or more user-configurable settings for the calendar item. For example, an organizer may be enabled to enable or disable live transcription, live viewing, live audio, saving of transcription, saving of video, saving of audio, partial and/or selective attendance, avatars for remote viewers, and other options.

An event creation user interface 300 may include a list of speakers expected to participate in the event associated with the calendar item. Event speakers may be listed with or without an expected time of speaking or time window.

Each of the settings, information, and other items of data within the event creation user interface 300 may be saved as part of a new calendar item. In some embodiments, upon creating a new calendar item, invitations to the event associated with the calendar item may automatically be sent out to users via, for example, email.

FIG. 4A is an illustration of a user interface 400 for an event invitation in accordance with one or more embodiments of the present disclosure. When an organizer creates a new calendar item or invites users to an existing calendar item, the invited users may receive an invitation via email. The invitation may be viewed using a calendar application. Opening a calendar application, a user may view a start time, end time, a location, an indication of an organizer of the event or calendar item, a listing of other invitees to the event or calendar item, a listing of topics to be covered during the event, a listing of keywords which may be discussed during the event, a listing of speakers planning to speak during the event, a listing of potential conflicts the invitee has during the time of the event, and options for responding.

The user interface 400 for the event invitation may include a listing of topics to be covered during the event. The listing of the topics to be covered during the event may include a start time or a time window during which the topic is scheduled to be discussed. The times associated with the listing of the topics may be set by the organizer during the creation of the calendar item. It should be appreciated that the listing of topics may be an incomplete list and that other topics may be discussed during an event. As opposed to or in addition to topics, other time-scheduled things may be listed, such as sub-events which are scheduled to occur during an event.

The user interface 400 for the event invitation may include a listing of keywords which may be discussed during the event. In some embodiments, an invitee may be enabled to edit the listing of keywords. Keywords added by an invitee may in some embodiments be presented to the organizer as a requested keyword.

The user interface 400 for the event invitation may include a listing of speakers to speak during the event. Speakers may be listed with or without an indication of a speaking time. For example, the invitation may include a schedule of speakers for the event or may include only a list of speakers.

The user interface 400 for the event invitation may include a listing of any potential conflicts for the invitee. The event invitation may show any events on the invitee's calendar beginning or ending within an amount of time prior to, during, or after the event associated with the calendar item. For example, the invitation may show any event ending within five minutes of the start time of the event associated with the calendar item, any event beginning less than five minutes after the end time of the event associated with the calendar item, as well as any event overlapping in time with the event associated with the calendar item.

The user interface 400 for the event invitation may include GUI elements enabling a user to respond to the event invitation. In some embodiments, the GUI elements may include a GUI element for attend, decline, maybe, partial attendance, selective attendance, and/or remote attendance.

When a user receives a meeting invite, in addition to accept, decline, and tentative or maybe, the invitation may allow one or more additional options for the user to select. For example, a selective attendance option may be used to indicate that the user is not interested in attending the entire meeting but only a specific section of the meeting. When the user accepts the meeting using a selective option, the meeting application may then allow the user to specify the topics of interest, or any keywords/phrases that the user is interested in, as illustrated in FIG. 4B.

Figure 4B:
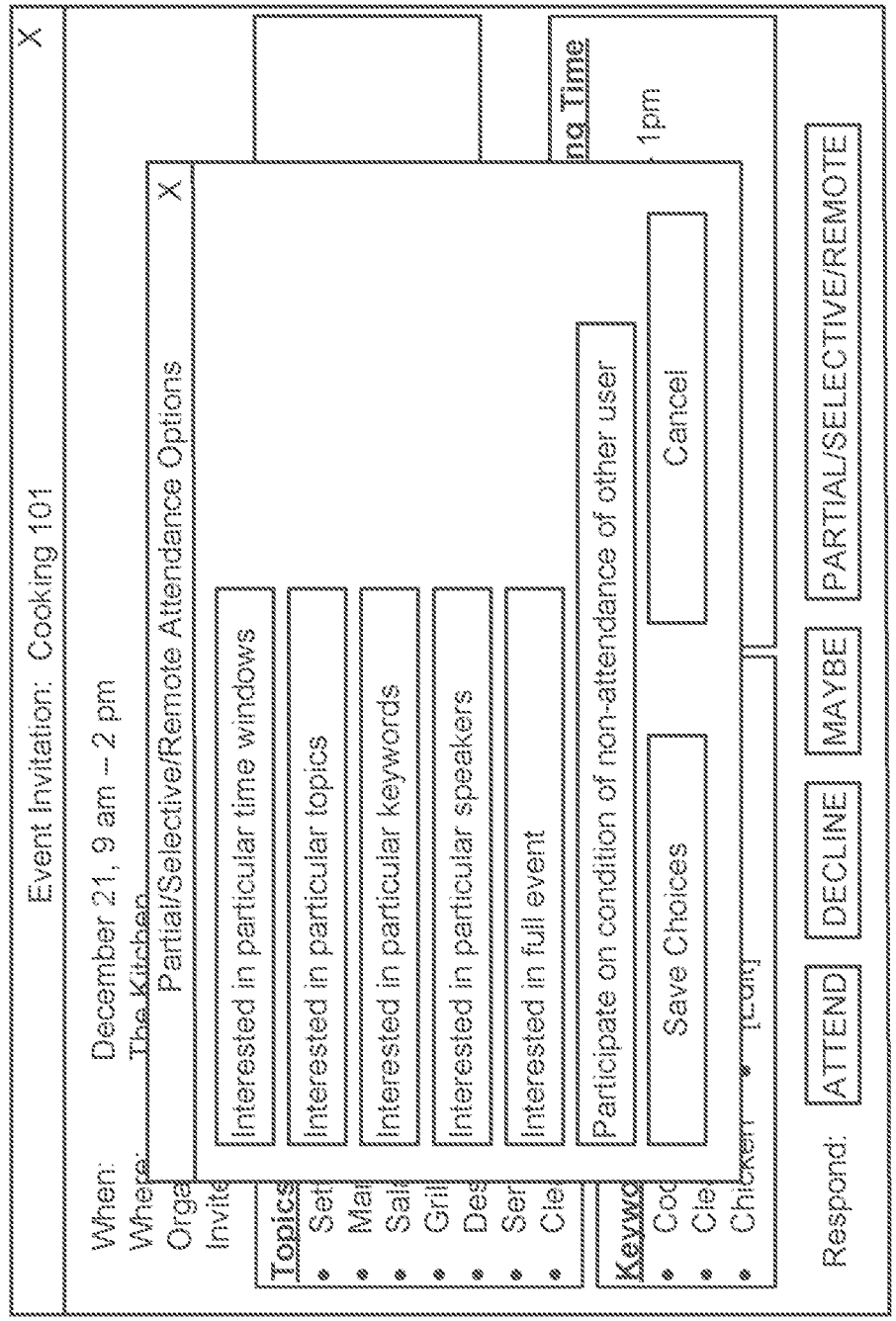

FIG. 4B is an illustration of a user interface 450 for an event invitation which may be presented to an invitee haven chosen to partially, selectively, remotely in accordance with one or more embodiments of the present disclosure. The user interface 450 may be displayed following an invitee choosing to partially, selectively, and/or remotely attend the event associated with the calendar item. In some embodiments, such a user interface 450 may include one or more GUI elements enabling a user to choose between one or more of interested in one or more particular time windows, interested in one or more particular topics, interested in one or more particular speakers, and interested in the full event. In some embodiments, a user may choose to participate on condition of non-attendance of other users. For example, the user may say they will attend only if a particular other person does not attend. Such a feature may enable users such as subject matter experts to attend only if needed—that is, if no other subject matter expert is attending.

Selecting one of the GUI elements illustrated in the user interface 450 may display a user-interactive list of the time windows, topics, keywords, speakers, etc. for the user to select between. For example, if the user selects interest in one or more particular topics, the user may be shown a user interface listing the topics included in the calendar item. The user may then select one or more of the topics.

FIG. 4C is an illustration of a user interface 450 for an event invitation which may be presented to an invitee haven chosen to partially, selectively, remotely in accordance with one or more embodiments of the present disclosure. The user can alternatively make a request to the meeting organizer to pull him in the meeting when the specific topic, phrases, and/or keywords are going to be discussed. In some embodiments, a user may be presented with an option related to recording of the event associated with the calendar item. When the user selects this option, the meeting can be recorded and once the meeting is finished a copy of the link where the recording is kept will be emailed or otherwise messaged to the user. For selective mode, the user may also be provided an option to provide only segments of interest, e.g., only (or also) provide recording segments, where the topic of interest is discussed, or the link can be sent to all users depending upon the system configuration. Note the participant may say that they are interested in topics B and D of a meeting, but ask for recordings of A and C, for example. Or A, B, and D. Or anything that is on agenda (or, B, D, and everything that was off-agenda), etc.

As illustrated in FIG. 4C, the user interface 450 may comprise one or more GUI elements enabling a user such as an invitee to choose between in-person attendance, attending via remote audio only, attending via remote video with or without audio, and/or attending via a live transcription of the audio. In some embodiments, livestreaming of the audio, video, and/or transcription can be implemented using instant messaging applications such as Slack, Skype, or a conference client.

The user interface 450 illustrated in FIG. 4C may comprise one or more GUI elements enabling a user such as an invitee to choose between receiving information after the event in addition to or instead of attending the event. For example, a user may select between receiving post-event audio, post-event video with or without audio, and/or post-event transcription.

In some embodiments, a conferencing system can allow several options to be system wide. Allowing user to be represented by an avatar when they are receiving live information such as a transcript or live video. Users may be enabled to configure their avatars in using an account profile.

For events in which one or more users have selected being interested in only one or more topics, each user may be brought into the event when one of the user's selected topics have been mentioned or have been scheduled to be discussed. For example, in some embodiments, an event monitoring system may analyze audio of an event to determine when a topic has been mentioned. If an organizer has described a schedule for the discussion of topics, a clock may be used to bring in users at the designated time for each user's selected topic.

Similarly, if a user is interested in hearing only from one or more speakers, the event monitoring system may be used to determine when the selected speaker or one of the selected speakers has begun to speak. If an organizer has described a schedule for the speakers, a clock may be used to bring in users at the designated time for each user's selected topic.

As events take place, a monitoring system, such as an application executing on a computer system may be used to process audio of the event to determine whether a topic, keyword, or phrase has been uttered or whether a particular speaker has begun to speak. Any number of possible audio analysis systems may be used, such as a speech analysis artificial intelligence system.

During an event, when a user's selected condition, such as the mentioning of a keyword or a particular speaker speaking, occurs, the user may be notified. For example, a popup window may display via a calendaring application on a computer associated with the user. In some embodiments, the user may automatically be joined with the event. A user may, in addition to or instead of choosing to join an event, choose to receive either a transcript or a recording of the event.

Transcripts of events may be automatically generated by a monitoring system for example by using an automatic speech recognition system. If a user selects to receive only a portion of a transcript of an event based on the utterance of a topic or the speaking of a given speaker, the monitoring system may automatically edit the transcript to crop out portions of the transcript of the event to leave only the portions relating to the topic or the speaker. The cropping of the transcript may comprise removing portions a predetermined amount of time, or number of words, before and/or after the topic or speaker.

Figure 5:
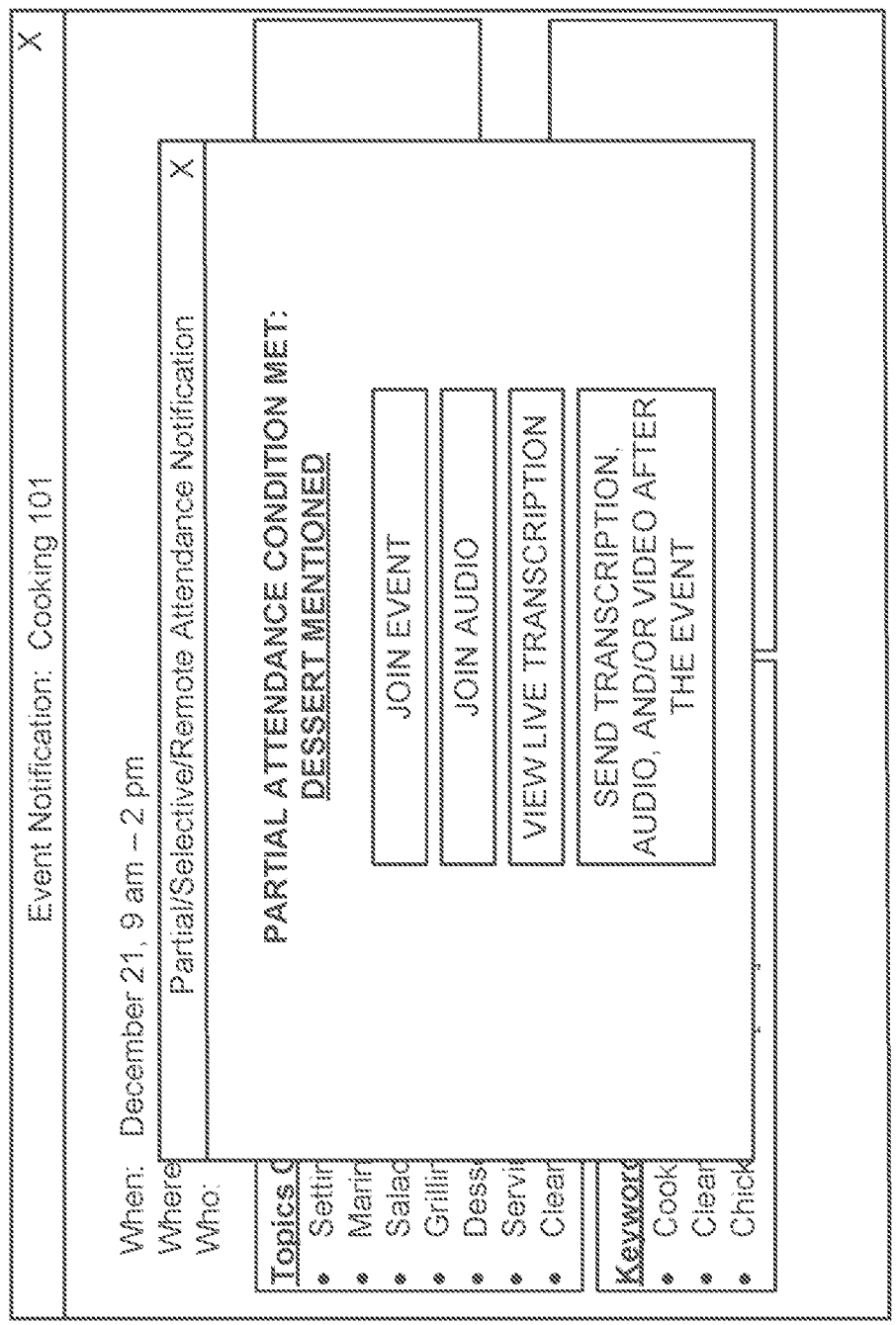

FIG. 5 is an illustration of a user interface 500 for a notification for a partial, selective, and/or remote attendee as described herein in accordance with one or more embodiments of the present disclosure. With a user interface 500 such as that illustrated in FIG. 5, a use may be notified of the satisfaction of the user's condition for joining the event and may be provided with a way to join or spectate the event. When a condition set by a partial, selective, and/or remote attendee has been met, a notification may be displayed on a user device such as a smartphone or a personal computer. The notification may be similar to the user interface 500 of FIG. 5.

The user interface 500 for a notification may comprise an indication of the condition having been met. For example, if a user has requested to join an event upon a particular speaker speaking, the user interface may include a message that the speaker is speaking. The user interface 500 may also include one or more graphical user interface elements enabling a user to choose between a number of options.

For example, a GUI element may enable the user to join the event via a live video application, join the event via an audio-only connection, view a live transcription. A user may also be provided an option via a user interface 500 to receive one or more post-event data formats. For example, a user may request a complete or edited transcription, audio, and/or video be sent to the user after the event.

In some embodiments, a user can configure the default way they would like to be pulled into a meeting when their specified criteria of keyword or phrase or other condition is met. A user may in some embodiments be brought into the meeting automatically. For example, the user's computer may automatically join the event. In some embodiments, the user may be brought in upon request by an organizer of the event. For example, if one or more users have requested to be brought in upon discussion of a particular topic, the organizer may determine the topic is being discussed and add the users to the event.

Figure 6:
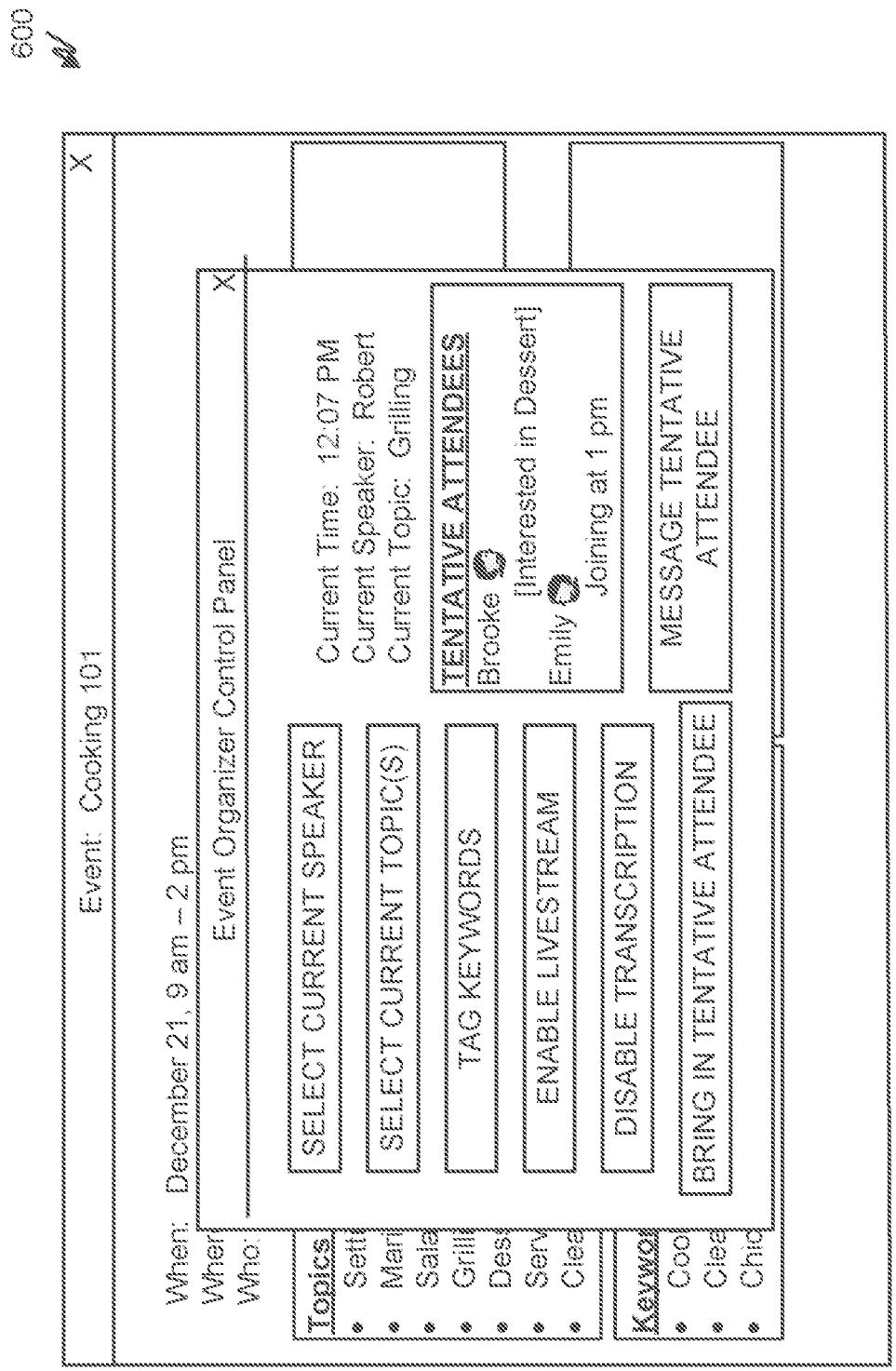

For an organizer to bring in users during an event, the organizer may use an organizer control panel user interface 600 such as that illustrated in FIG. 6. An organizer control panel UI may in some embodiments include a number of graphical user interface elements enabling the organizer, or another user, to select between a number of options. The organizer control panel UI may include a GUI element enabling a user to select a current speaker. The select current speaker GUI element may be a drop-down menu or a text box or other system for choosing a text string identifying a current speaker or speakers.

The organizer control panel UI may include a GUI element enabling a user to select a current topic. The select current topic GUI element may be a drop-down menu or a text box or other system for choosing a text string identifying a current topic or topics.

The organizer control panel UI may include a GUI element enabling a user to tag keywords. Tagging keywords may comprise typing or selecting a word or phrases identifying a current discussion. The tags may be stored in memory along with a current time such that the tags may be linked to a recording or transcript of the event.

The organizer control panel UI may include a GUI element enabling a user to enable or disable livestream. For example, an organizer may desire only a particular portion of the event be livestreamed. Using an organizer control panel, the organizer may be enabled to allow or disallow or enable or disable a livestream of the event. The organizer may be enabled to activate video broadcasting or allow only audio streaming. Similarly, the organizer control panel may be used to enable or disable transcription streaming during the event.

The organizer control panel UI may include a GUI element enabling a user to interact with attendees such as those attendees haven chosen to join an event only for a particular topic or based on another condition. For example, the organizer control panel may be used to bring in a tentative attendee, message a tentative attendee, and view tentative attendees along with their attendance condition, or selected topic/keyword/speaker, etc.

The organizer control panel UI may also include a UI display enabling a user to view a current time, topic, speaker, etc.

Figure 7:
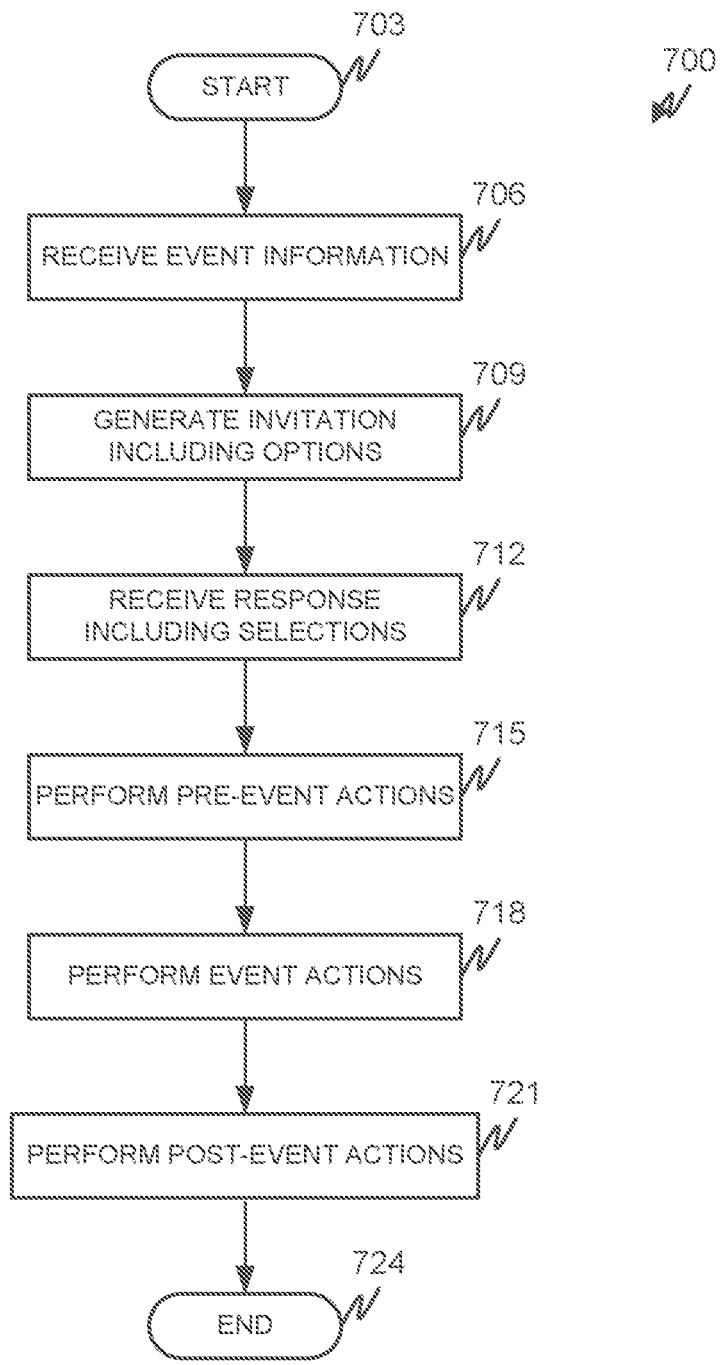
FIG. 7 is a flowchart of a method in accordance with one or more embodiments of the present disclosure.

FIG. 7 is a flowchart of a method 700 in accordance with one or more embodiments of the present disclosure. The method 700 may begin at step 703 in which an organizer of an event may interact with a computing device and create a calendar item using a calendaring application.

At 706, the computing system may receive event information. For example, the organizer may input information such as that illustrated in FIG. 3. The event information may include, but should not be considered as being limited to, starting and ending dates and times, schedule and/or listing of topics, listing of keywords, speaker list or schedule, etc.

At 709, an invitation may be generated by the computing system. Generating the invitation may comprise creating an invitation based on the event information input by the organizer. The invitation may be similar to that illustrated in FIG. 4A. After the invitation has been created, the invitation may be automatically sent to each invitee.

At 712, responses may be received from one or more of the invitees. The responses may include selections of keywords, topics, speakers, etc. such as illustrated and described herein in relation to FIGS. 4B and 4C.

If a recording or transcription is requested by an invitee, the organizer may in some embodiments be notified and may be given the opportunity to grant approval. In some embodiments, approval may be given on a case-by-case basis. For example, the organizer may allow only certain users to spectate remotely or receive a live video. As an option, when a person asks for a recording of a meeting, other participants who have or have not already responded may be presented with a new option to respond to also receive the recording. Partial permission can be granted as well. For example, the organizer may allow for audio recordings but not video. If a recording is allowed, once the meeting is over, the link of the recording may in some embodiments be sent to all participants.

At 715, based on the responses from the invitees, one or more pre-event actions may be performed. For example, an organizer user interface may be created. The organizer user interface may, as discussed herein, enable an organizer to perform a number of actions relating to an event such as bring attendees into the event, view what each attendee is interested in, create tags, begin or end a recording, view and select current topics, etc.

At 718, based on the responses from the invitees, one or more actions may be performed during an event. For example, a live transcription may be automatically generated. When a meeting starts, users who have requested a live transcription or other type of remote attendance may be represented to other participants of the event by an avatar.

Audio during the event may be received by computer devices participating in the event may be received by a server. The server may be configured to transcribe the audio received from users. The server may send, in or near real-time, each transcribed line to users via a user's preferred IM channel, such as Slack, Skype, Avaya Spaces, etc.

Similarly, a live audio/video stream may be generated and may be, if requested by a user, recorded. If a participant has requested a recording, the event may be automatically recorded. If a user has requested for a recording of only portions of an event relating to a particular topic, the meeting may be either recorded only for topics of interest, or it can be completely recorded, and then parsed automatically to send parts as selected to participants.

In some embodiments, the meeting can be livestreamed to users using any IM app, such as Slack, Microsoft Skype, etc. If a user has requested to join an event for only portions of the event relating to one or more particular keywords, when the keywords that the user has expressed interest in are encountered in the transcription, the user can be prompted to join the meeting, or may be automatically pulled in the event. In some embodiments, when a user is referenced by any other user, the user can be prompted by a conference client app to optionally join the event.

Detecting keywords, topics, and speakers may be based on a transcript of the event. For example, a speech analysis system may be used to create the transcript and a text analysis system may be used to determine whether any particular topic or keyword has been mentioned. A user may be notified when the requested topic or keyword has been mentioned via a notification. A portion of the transcript including the topic or keyword can be shown in the message prompt of the notification.

In some embodiments, a user may, upon satisfaction of a condition, be switched from a remote viewing mode to be an active participant in the event, as well as be switched from an active speaker to a remote viewer. Prior to a selective mode user joining an event, the user may be displayed in the event as an avatar. When the selective mode user joins the event, the user's camera may be enabled, and the user's avatar may be replaced with a live video feed. The user can later switch back to the avatar mode or exit the meeting.

During the event, when a user-requested topic or keyword has been mentioned or a requested speaker has begun speaking, a notification such as that illustrated in FIG. 5 may be generated as sent to any requesting users.

During the event, a computer device associated with the organizer or another user participating in the event may display an organizer control panel such as that illustrated in FIG. 6. Using the organizer control panel, the organizer or another user may be informed as to which topics or keywords a selective participant is interested. If a user specifically requests the organizer to pull him/her in the event when a specific topic is going to get discussed, the organizer may be enabled to click on a GUI button or otherwise interact with a GUI element to bring in or notify the user. After which the specified user may be prompted to join the event.

As 721, one or more post-event actions may be automatically performed. For example, a transcription or recording created during the event may be analyzed to detect keywords, phrases, topics, and speakers. Based on the detection of keywords, phrases, topics, and speakers, and based on requested post-event transcriptions and/or recordings, edited transcriptions and/or recordings may be generated.

Any generated edited transcriptions and/or recordings or full transcriptions or recordings may be sent to requesting users after the event. In some embodiments, versions of transcriptions and/or recordings may be posted to a file sharing website with identifying features such as metadata explaining what topics, keywords, phrases, speakers, etc. are covered by the transcription or recording.

When an event ends, any recording or transcription created during the event may be saved to a data storage location, for example on a server. A hyperlink to the location may be sent to either requesting users or all participants.

Users having chosen a selective attendance option may also be sent specific sections of the recording, for example when the topic the user has specified is detected in the transcription. In some embodiments, clearly marked segments may be provided in the recording.

In the event of a user requesting a recording or transcription of only specific segments of an event, for example segments of an event relating to a particular speaker, topic, keywords, and/or phrases, a buffer may be used in the editing of the recording or transcription. For example, a number of minutes prior to and following the utterance of the requested topic, keyword, or phrase; prior to and following the scheduled discussion of the requested topic; prior to and following the scheduled speaking of the requested speaker; prior to and following the detection of the speaking of the requested speaker; etc.; may be included in the edited recording and/or transcription to ensure a satisfactory amount of data is included in the edited recording and/or transcription. The amount of time of the buffer may in some embodiments be configured as a specific number of time, for example two minutes, or may be based on other factors, such as length of time the topic is being discussed or the length of time the speaker is detected as speaking.

As an example, if a topic requested by a user having chosen to participate selectively in an event was detected to have been began to be discussed in the event at 15 minutes and 50 seconds and detected as being ceased to be discussed at 20 minutes and 20 seconds, and the amount of buffer time is set at one minute. 15.50 minutes, and stopped at 20.20 minutes, and BNM is 1. A recording segment may be created for the topic and may contain audio and video from 14 minutes and 50 seconds to 21 minutes and 20 seconds for a total of six minutes and 30 seconds. In some embodiments, a recording of the entire event may be created with annotations to show where the topic is discussed. In some embodiments, a recording of a segment where the requesting user participated and exited the event with or without buffer time may also or alternatively be created. The requesting user can be sent (i) a link to the six minutes and 30 seconds recording in which the requested topic is discussed; (ii) a link to a recording of the entire meeting, which has segments marked, according to the topic's discussed; and (iii) a link to a recording of a segment where the requesting user participated and exited the event with or without buffer time. At 724, the method 700 may end.

As an example, consider a user requesting a live transcription, a live video stream, a live audio-video stream, and/or a live audio-only stream of an event for only portions of the event in which one or more particular topics are discussed. A method such as that discussed above with regards to FIG. 7 may begin upon the event organizer creating the calendar item relating to the event.

The user may respond to the invitation by requesting the live transcription, live video stream, live audio-video stream, and/or live audio-only stream of the event and may specify the user is only interested in portions of the event in which the one or more particular topics are discussed.

During the event, the audio of the event may be monitored by a monitoring system. When the requested topic is discussed or scheduled to be discussed, the requested live transcription, live video stream, live audio-video stream, and/or live audio-only stream may be initiated. The user may be notified that the stream has begun and may be sent a notification including one or more GUI elements enabling the user to view the stream. The user may also be provided an option to download the recording or saved transcript after the event ends or as soon as the discussion of the topic has ended.

In some embodiments, each time the requested topic is tagged, detected, or scheduled, the audio, video, or live transcription may begin streaming for a predetermined amount of time, or an artificial intelligence system may be used to determine whether the requested topic is being addressed.

Similarly, if a user requests a post-meeting transcription, video, and/or audio of the event relating only to one or more requested topics, the user may not be notified during the event or provided a way to stream the event live and may instead be sent a link to the saved transcription or recording including the portion or portions of the event relating to the requested topics with or without buffer time.

As another example, consider a user requesting to live stream or view a live transcript for an event only during a particular time window. Such a user may desire to watch a pre-scheduled portion of the event. For example, the organizer may have input a schedule in the calendar item. In such a scenario, the user may receive notification including a link to a live stream or live transcription which may begin at the beginning of the time window or a predetermined amount of time prior to the time window. At the end of the time window, or a predetermined amount of time following the time window, the stream may optionally end. After, the user may be provided an opportunity to download or save the recording and/or transcription.

Similarly, if a user requests a post-meeting transcription, video, and/or audio of the event for only a particular time window, the user may not be notified until after the time window and may at that point be provided the opportunity to download or save the recording and/or transcription.

As described above, agile meeting options for a user to select may include a number of different attendance modes. For example, a user may accept a meeting to signify he or she will attend the meeting in person as invited. The user may instead decline the invitation to signify he or she will not attend the meeting. The user may select an attendance mode of a post-meeting recording which may result in a computer system recording the meeting for the user and sending the user a link to a recording of the meeting. The user may select an attendance mode of attending the meeting by watching a live stream of the meeting. The user may select an attendance mode of viewing either a live stream or a post-meeting recording only for portions of the meeting involving certain keywords and/or topics. The user may select an attendance mode of using an automated attendee (BOT) to represent the user to attend the meeting on the user's behalf. The BOT may represent the user and present user's responses in the meeting such as voting-by-proxy. In some embodiments, a BOT may be configured to capture data during an event, such as by taking notes, recording audio/video, etc., and/or to provide inputs provided by the user the BOT is representing in the event. The user may select an attendance mode of a custom option with various combinations of the above attendance modes.

Given the many attendance modes available to a user invited to a meeting or other type of event, the user may be enabled to participate and/or learn from the meeting in a wide variety of ways. Because the systems and methods described herein provide users so many options for attending or learning from events and meetings, users can choose an attendance mode which best fits the user's schedule. However, users often cannot adequately make the best decision regarding an attendance mode. Choosing the best attendance mode may require performing an in-depth analysis of the user's calendar, comparing topics and scheduled discussions of the event with the user's expertise, determining what other users are invited to or have accepted the invitation, checking the time of day of the meeting, who has chaired the meeting, whether there are any other meetings scheduled that overlapping with a particular meeting, and many other factors. Users often do not have time to perform the required analysis to make a proper choice of attendance mode for a given invitation. A user may miss selecting an appropriate attendance mode for an event which may result into a default selection of an attendance mode that may not be appropriate for the user for the event As a result, what is needed is a way to provide users a recommendation of an attendance mode for an invitation in real-time such that the recommendation may be displayed within the invitation itself. In some embodiments of the systems and methods described herein, a system may adjust the recommendation of the attendance mode for a particular event if and when another event is scheduled that would affect the existing recommendation. For example, a user may be scheduled to attend a first event using a recommended attendance mode. The user may receive a new meeting invite for a second event which is scheduled to overlap with the first event for a period of time. The system may detect such a scenario and notify the user that the recommended attendance mode for the first event has changed. In some embodiments, the attendance mode for the first event may be changed automatically.

To resolve the above-described issues with calendaring applications, a system may be implemented capable of recommending which of these meeting attendance modes a particular user should choose for a particular meeting. The system, on a best effort basis, may select the best possible attendance mode with a goal of reducing stress of the user as well as managing the time of employee in an efficient way amidst the plethora of virtual meetings.

The system may be configured to take into consideration several permutations and combinations of various aspects as described herein in order to generate a recommendation for a user regarding which response option the user should choose for a particular meeting. In some embodiments, the system may automatically select the recommended response option by default.

In some embodiments, the system may employ a rule-based approach where several rules can be programmed into the system, for example when sufficient past analytics about a specific user are not available, or a more sophisticated artificial intelligence (AI) and/or machine learning (ML) based approach can be used, where a ML model may be trained on past meeting attendance of a user as well as the user's participation in past meetings to create a trained model to be used for future meeting invitations. While the description herein describes the use of a neural network to perform analysis, it should be appreciated the same or similar analysis may be performed without the requirement of machine learning algorithms.

Figure 8:
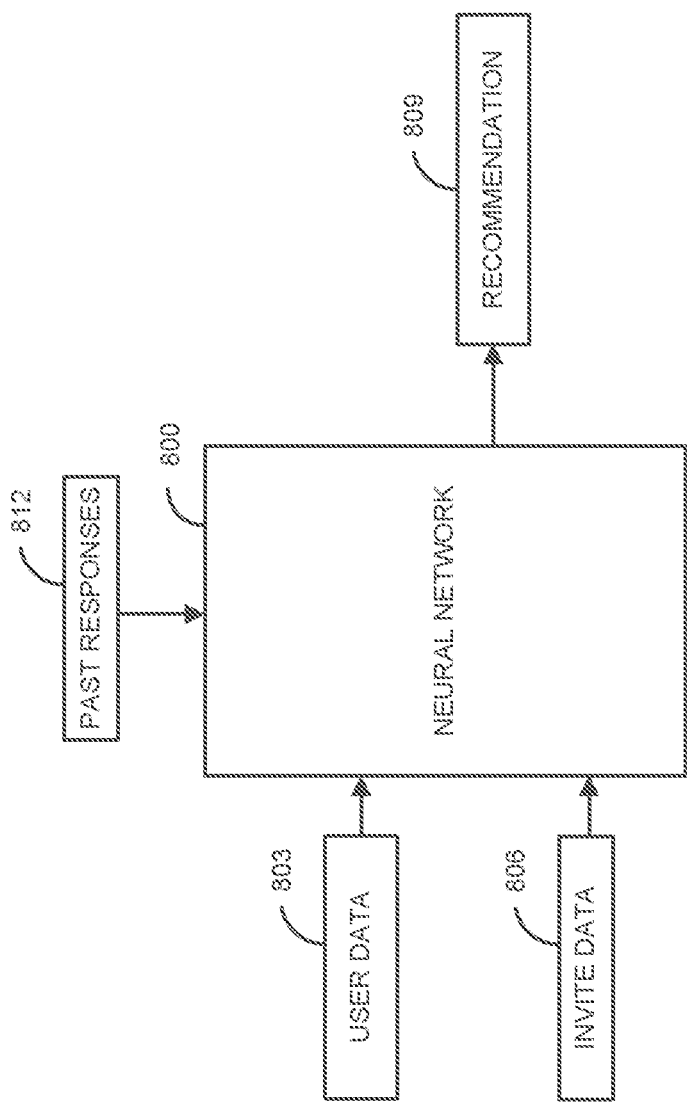
FIG. 8 is an illustration of a neural network in accordance with one or more of the disclosed embodiments.

As illustrated in FIG. 8, a neural network 800 may accept as inputs user data 803 and event data 806 and may output a recommendation 809. In some embodiments, the neural network 800 may be trained using past user responses 812 or feedback to recommendations among other data. The neural network 800 may be an application executing on one or more user devices or servers as described herein and is described in greater detail below.

In some embodiments, the neural network 800 may be trained initially using a wide variety of users. In some embodiments, a neural network 800 may be trained for a particular group such as an employees of a particular corporation. The neural network 800 may also be trained on a continuous basis as and when more data is available to the system about a user's attendance to a particular meeting.

It should be appreciated, the system can employ a combination of both a rules-based and AI/ML-based approach, where the rules can be formed based on preferences provided by a particular user for particular categories of meetings. In such an embodiment, certain rules may override the decision of a ML model or vice versa.

Based on analysis of the invitation and the invited user, a recommendation may be displayed to the user as to how the user should respond to the meeting. Such a recommendation 903 may be displayed as part of the invitation 900 to the event as describe in greater detail below.

Figure 10:
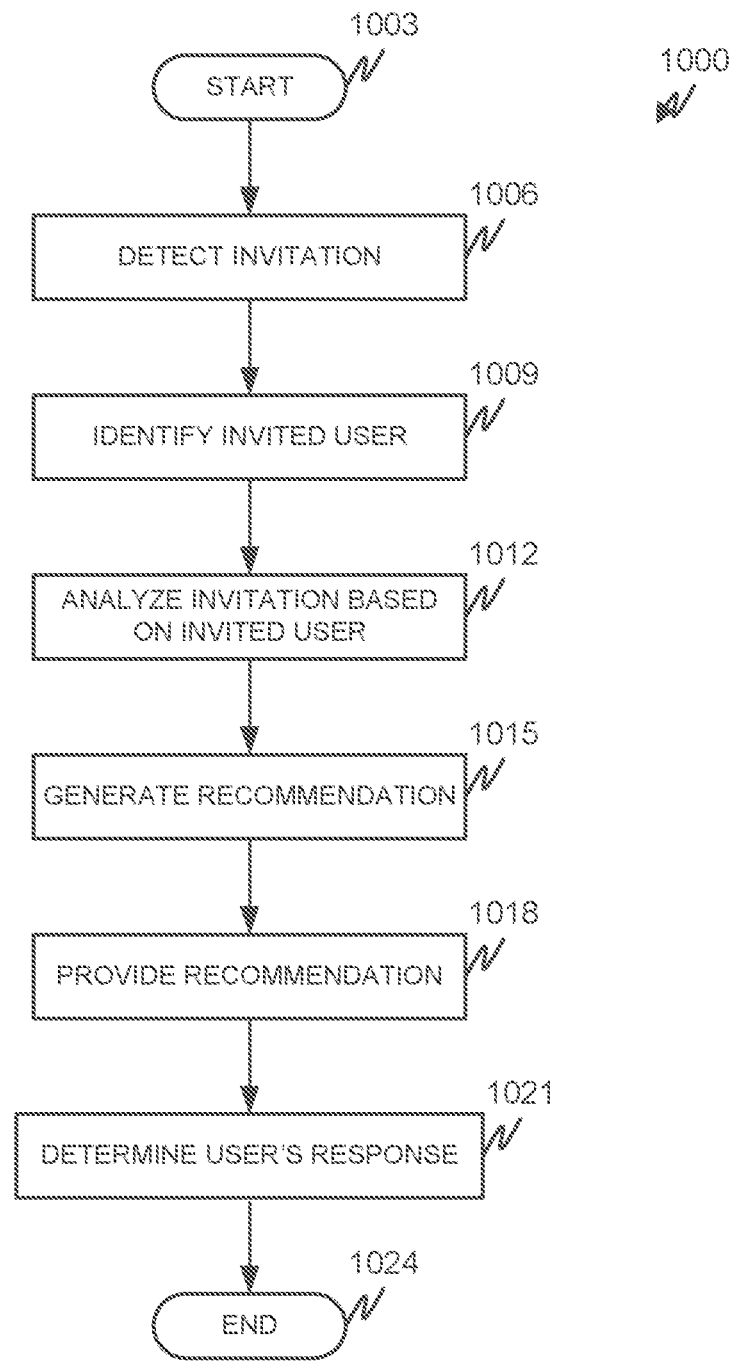
FIG. 10 is a flowchart of a method in accordance with one or more of the disclosed embodiments.

As illustrated in FIG. 10, a method 1000 of generating a recommendation for attendance mode for a user invited to an event in accordance with one or more of the embodiments described herein begins at 1003. As described herein, an event may be a meeting held through the use of a conferencing application. Users may be invited to events through software applications such as email and/or calendaring applications.

At 1006, an invitation is detected or received by a computer system. For example, the method 1000 may be executed by an application running on a computing device associated with the recipient of the invitation. Detecting an invitation may comprise receiving an invitation sent via an email or other form of communication and determining the email or other form of communication includes the invitation.

In some embodiments, the method 1000 may be executed by another computing system such as a server. For example, after a user sends an invitation to another user, the invitation may be processed by a server prior to being delivered to the other user. The server may be configured to perform steps of the method 1000 as described below.

At 1009, the user invited by the invitation is identified. Identifying the user may comprise associating an email address, username, or other form of identification of the invited user contained within the invitation with user information stored within one or more databases.

In some embodiments, the method 1000 may be performed by a computer system associated with the invited user, such as a personal computer operated by the invited user. In such an embodiment, identifying the user may comprise simply accessing data relating to the user within the personal computer.

Identifying the user may comprise obtaining data related to the user. For example, the computer system executing the method 1000 may gather data associated with an electronic calendar associated with the user, such that information relating to the user's schedule can be determined.

Using electronic calendar data, the computer system may be capable of analyzing events within close temporal proximity to the event associated with the invitation, determining an average number of events the user participates in each day, determining whether the user is active during particular portions of the day, for example, if the user works between 9 am and 5 pm, determining the time zone in which the user lives, the location of the user throughout the day and an estimated location of the user based on calendar events, etc. The data gathered regarding a user and/or his or her calendar may be normalized and/or processed and stored in a database so as to be capable of being utilized for training a ML model or for deriving certain patterns or rules out of the data.

The computer system may also access information relating to the user's overall workload, areas of expertise, job duties, corporate hierarchy, e.g., an identity of the user's manager, peers, etc. Using the calendar data as well as other data available to the computer system, the computer system may be configured to analyze past meetings. For example, the computer system may be configured to determine what meetings the user has been invited to and/or attended in the past, what topics were discussed in the past meetings, whether the user participated in the past meetings, which attendance mode the user used to attend each past meeting, whether a particular attendance mode was recommended to the user, whether the user accepted the recommended attendance mode, etc.

The computer system may further be configured to determine a level of participation of the user in a particular past meeting with specific attributes, such as whether the user contributed a particular percentage, e.g., 10%, 50%, 100%, etc., or a particular amount of time, e.g., a few minutes or an entire time of the meeting, or whether user just listened without contributing to the meeting.

Meeting attributes such as an identity of a chair of a past meeting, whether the past meeting was recurring or a single occurrence, a title and topic of the past meeting, contents of an agenda of the past meeting, a number of invitees to the meeting, e.g., whether the meeting included a large or small number of invitees or whether the meeting was a one-to-one meeting, etc.

All such data gathered about a user for one or more past meetings along with attributes of each past meeting can be used as input parameters to the ML model. For a combination of different input parameters and their respective score, the ML model may be trained to output a specific recommendation of attendance mode from available modes. The output of model may also be affected by considering a user's feedback to the recommended mode based on past meetings attended by user.

If sufficient data about user's behavior in the past is not available, then certain rules programmed into the system would be used to arrive at the recommendation. At 1012, the invitation is analyzed based on the data gathered relating to the invited user. Analyzing the invitation may comprise in some embodiments determining a number of invitees, or people invited to the meeting. Whether each invitee accepted or denied the invitation may also be determined and used in the analysis of the invitation.

Analyzing the invitation may also comprise analyzing each of the other invitees to the meeting. For example, the job positions, roles, duties, expertise, relation to the invited user, and other factors may be considered. Information such as an identity of a leader, organizer, chair, etc., of the meeting may also be used to analyze the invitation.

In some embodiments, analyzing other invitees to a meeting may comprise determining one or more of a personal relationship and a professional relationship between the user having received the invitation and each of the other invitees. Analyzing personal relationships may comprise, for example, determining whether the user having received the invitation is family with any of the other invitees, whether the user having received the invitation is friends with any of the other invitees, etc. Analyzing professional relationships may comprise, for example, determining whether the user having received the invitation is a supervisor or manager of any of the other invitees, whether the user having received the invitation is supervised or managed by any of the other invitees, whether the user having received the invitation is a peer or colleague of any of the other invitees, etc.

Analyzing the invitation may also comprise determining whether the meeting is a recurring event or a one-time event, which topics may be addressed during the meeting, and contents of an agenda or schedule for discussion of the meeting if one exists.

Analyzing the invitation may comprise inputting information relating to the invitation and information relating to the invitee as described above into a neural network 800 as illustrated in FIG. 8. The neural network 800 may be configured to output a recommendation 809 in step 1015.

At 1015, a recommendation for an attendance mode for the user to use to attend the meeting associated with the invitation may be generated. It should be appreciated that an attendance mode may comprise any one of attending in person, attending remotely, attending only a portion, attending by viewing or listening to a recording after the event, not attending at all, or any of the means of participating in an event as described herein.

In some embodiments, the neural network 800 may be trained to recommend an attendance mode for the invited user based on an analysis of data associated with the user and data associated with the event associated with the invitation. Generally speaking, the neural network 800 may generate a recommendation by selecting which attendance mode will best suit the invited user. Factors which may be used to select the best attendance mode may be, for example, risk of causing unnecessary stress, the importance of the invited user to the event, the importance of the event to the user, etc.

Factors for recommending the attendance mode may be analyzed based on input data relating to the user's workload, expertise, job duties, etc., as well as input data relating to the event itself. Factors may be weighed according to user preferences, administrator settings, or may be set to a level designed to maximize user efficiency.

Training of the neural network may initially involve using a large number of users with a wide variety of characteristics. In some embodiments, a neural network 800 may be trained for a particular group such as an employees of a particular corporation, employees of a particular job-type or function, etc. In some embodiments, the various kind of rules can be used until sufficient data for the user becomes available and as and when training data is collected about user, the training data may be used to train a ML model. In some embodiments, a combination of ML and a rules-based approach will be used. The neural network 800 may also be trained on a continuous basis as and when more data is available to the system about a user's attendance to a particular meeting.

In some embodiments, a meeting invitation may be analyzed based on other users invited to the meeting. Analyzing a meeting invitation based on users invited to the meeting may comprise determining a number of invitees.

The neural network 800 may be trained to determine the invited user's significance in the event based on the number of other users invited. For example, the more participants in a meeting, the less of an affect each participant may have in the meeting. As such, the neural network 800 may determine the user's role in a meeting with a relatively large number of invitees as compared to an average meeting to which the user has been invited is likely to be insignificant while the user's role in a meeting with a relatively small number of invitees is more likely to be significant. Such determinations may be used to compare factors when determining which attendance mode to recommend.

The neural network 800 may also be trained to determine whether any of the other invitees are professionally-related to the invited user. For example, it may be determined that if a user's manager or supervisor or other type of higher-position officer is attending, the invited user should attend in person. Based on this analysis, the system may be enabled to make a determination as to whether the invited user should attend the meeting in person or select some other attendance mode.

As described herein, attendance modes may include attending in person, attending remotely via audio and/or video, viewing a live-feed of a transcript, attending partially, receiving data such as audio, video, and/or transcript post-meeting, attending via a bot-proxy, or declining.

In general, a particular attendance mode may be selected based on weighing factors of the impact of the event to the user and the impact of the user to the event for each attendance mode. For example, a computer system may be configured to determine how important an event is to the invited user. Determining a level of importance an event may have to the invited user may comprise analyzing data associated with the user's job duties, data associated with other attendees to the event, etc. As an example, if an event is directly related to a user's job duties and/or a manager or other supervisor of the user is scheduled to attend the event, the computer system may determine the event is of a particular importance to the user. Such a determination may be made on a percentage or score basis. In some embodiments, a threshold may be used, for example, an event may be determined to be at a high level of importance to a user if factors indicating the event is important to the user exceed a certain score.

As another example, a computer system may be configured to determine how important the invited user is to the event. Determining a level of importance the user has to an event may comprise analyzing data associated with the user's job duties, data associated with other attendees to the event, etc. As an example, if an event is directly related to a user's job duties and no other or few of the user's peers in his or her expertise is scheduled to attend the event, the computer system may determine the user is of a particular importance to the event. Such a determination may be made on a percentage or score basis. In some embodiments, a threshold may be used, for example, a user may be determined to be at a high level of importance to an event if factors indicating the user is important to the event exceed a certain score.

As another example, a computer system may be configured to determine whether a user is physically capable of attending an event and/or how physically impactful attending an event in-person would be to the user. Determining a level of physical impact attending the event would have to the user may comprise analyzing data associated with the user's normal schedule, e.g., the normal working hours for the user, the user's schedule in times before or after the event, e.g., whether the user is scheduled to be in a location distant from a location of the event within a particular time range before or after the event, etc. Because some people may be more stressed over attending a meeting than others, the physical impact of an event may be user-specific. The computer system may be configured to learn user preferences over time, such as whether a user is particularly stressed or otherwise impacted by in-person meetings or whether the user particularly enjoys in-person meetings. As an example, if a user is typically overly stressed by events in which more than three people are attending and if the event takes place at a time during which the user is typically away from the office, the computer system may determine attending the event in-person would have a relatively high physical impact to the user.

Whether the computer system recommends a user attend an event live and in-person, remotely via audio and/or video may be recommended, by viewing a live-feed of a transcript, attending only for a particular topic or time period, by receiving data such as audio, video, and/or transcript post-meeting, attending via a bot-proxy, or declining the meeting altogether may depend on a number of factors which may be weighed according to user or administrator settings. In some embodiments, such factors may be provided as an input to a neural network which may be trained to output a recommendation. As an example of the recommendation determination process live, in-person, attendance may be recommended if the event is determined to be of a relatively high importance to the user, the user is determined to be of a relatively high importance to the event, the user is determined to be physically capable of being at the event without incurring a high level of impact, and/or the timing of the event is determined to fit in the user's calendar based on normal work hours and location. These and other factors may be weighed and/or input into a neural network which may be trained to recommend the attendance mode to be selected by the user. Similarly, an attendance mode comprising attending an event remotely via audio and/or video may be recommended if the event is determined to be of a relatively high importance to the user, the user is not determined to be of a relatively high importance to the event, the user is not determined to be physically capable of being at the event without incurring a high level of impact, and/or the timing of the event is determined to fit in the user's calendar based on normal work hours and location. These and other factors may be weighed and/or input into a neural network which may be trained to recommend the attendance mode to be selected by the user.

An attendance mode comprising viewing a live-feed of a transcript may be recommended if the event is not determined to be of a relatively high importance to the user, the user is not determined to be of a relatively high importance to the event, the user is not determined to be physically capable of being at the event without incurring a high level of impact, and/or the timing of the event is determined to fit in the user's calendar based on normal work hours and location. These and other factors may be weighed and/or input into a neural network which may be trained to recommend the attendance mode to be selected by the user.

An attendance mode comprising attending only a portion of an event, such as based on timing, topics, mentioned keywords, agenda, speakers, etc., may be recommended if the event is not determined to be as a whole of a relatively high importance to the user, but some topic, keywords, agenda, or scheduled speaker, is determined to be relatively important to the user. The computer system may recommend the user attend only a particular amount of time during the meeting if the computer system determines a more important event overlaps the event. These and other factors may be weighed and/or input into a neural network which may be trained to recommend the attendance mode to be selected by the user.

Recommending a user choose to not attend an event but to instead record and receive data such as audio, video, and/or a live-stream of a transcript or a post-meeting transcript of the event may be based on a determination that the event is to be of a relatively high importance to the user, the user is not to be of a relatively high importance to the event, the user is not to be physically capable of being at the event without incurring a high level of impact, and/or the timing of the event is not to fit in the user's calendar based on normal work hours and location. These and other factors may be weighed and/or input into a neural network which may be trained to recommend the attendance mode to be selected by the user.

Recommending a user not attend an event but to instead use a bot-proxy as a representative of the user may be based on a determination that the event includes a vote in which the user may need to voice his or her input and that the event is not to be of a relatively high importance to the user, the user is not to be of a relatively high importance to the event, the user is not to be physically capable of being at the event without incurring a high level of impact, and/or the timing of the event is to not fit in the user's calendar based on normal work hours and location. These and other factors may be weighed and/or input into a neural network which may be trained to recommend the attendance mode to be selected by the user.

Recommending a user decline an event, and not record or in any way participate in the event, may be based on a determination that the event does not include any vote which the user may need to voice his or her input and that the event is not of a relatively high importance to the user, the user is not of a relatively high importance to the event, the user is not to be physically capable of being at the event without incurring a high level of impact, and/or the timing of the event is not determined to fit in the user's calendar based on normal work hours and location. These and other factors may be weighed and/or input into a neural network which may be trained to recommend the attendance mode to be selected by the user.

The above-described examples are included for example purposes only and should not be considered as limiting the systems and methods as described herein to any particular weighting of factors.

In some embodiments, a meeting invitation may be analyzed based on analysis of one or more past meetings or other types of events. The computer system may be configured to identify past events related to the event associated with the invitation. For example, if the invited event is a recurring event, the computer system may be configured to determine whether the invited user participated in past occurrences of the recurring event. Similarly, the computer system may be configured to identify previous events which were related to the same or a similar topic as the event associated with the invitation. The computer system may be further configured to determine whether the invited user participated in one or more events related to the same or a similar topic, and/or to what extent the user participated in the one or more events. Such determinations may be used by the neural network to compare factors when determining which attendance mode to recommend.

In some embodiments, a meeting invitation may be analyzed based on other meetings on the user's calendar which are temporally proximate to the event associated with the invitation. If two meetings temporally overlap either completely or partially, the computer system may be configured to determine an attendance mode for both the event associated with the invitation as well as the overlapping meeting, an invitation to which the user may have already accepted. The computer system may be configured to utilize a neural network 800 as described herein to way factors for both the event associated with the invitation as well as the already-scheduled event and determine a best attendance mode for each.

For example, consider a user having a pre-scheduled daily scrum meeting scheduled from 10:30 to 11 am who receives an invitation to a weekly sync-up meeting which was scheduled by the user's manager from 10:30 to 11 am. In this case, the system may determine preference should be given to the meeting scheduled by user's manager and provide a recommendation to the user to attend the weekly sync-up meeting in person and to attend the daily scrum meeting using a bot proxy attendance mode.

As a second example, consider a user receiving an invitation to a knowledge sharing session event scheduled from 4-5 pm. A large number of employees from a variety of different teams are also invited. Also on the user's calendar is a project level meeting scheduled from 4-4:30 pm. Only three other employees are invited to the project level meeting. The project level meeting is one of a recurring set of events. Based on past meeting data, the computer system determines the user has had a significant contribution to the meeting subject from past meeting analysis. Based on weights of factors relating to risks of stress, the importance of the user to the event, and the importance of the event to the user, the computer system may analyze the user's schedule as well as the invitation and meeting details relating to both the knowledge sharing session event and the project level meeting and generate a recommendation to the user as to which attendance mode to select for each of the knowledge sharing session event and the project level meeting. For example, the computer system may recommend the user select the attendance mode of post meeting recording for the knowledge sharing session event and to select the attendance mode of in-person attendance for the project level meeting.

In some embodiments, recommendations may be generated by the computer system based on an analysis of meetings scheduled immediately before or immediately after the event associated with the invitation. Because back-to-back or otherwise close-in-time meetings add to the stress of users, the computer system may be configured to analyze meetings or other events scheduled immediately before or immediately after an event associated with an invitation. The computer system may be configured to generate and provide appropriate recommendations to the user on which attendance mode the user should select for each of the meetings to reduce the impact of stress on the user.

In some embodiments, a meeting invitation may be analyzed based on a time of day and the user's normal work schedule. The computer system may be configured to determine whether a meeting associated with an event is scheduled after hours, e.g., late at night or early in the morning. The computer system may also be configured to determine what hours the user typically works and/or attends meetings.

In some embodiments a role and/or a user profile of a user may be analyzed. The computer system may be configured to determine whether a user is a developer, a manager, a programmer, etc. For example, since programmer and developer are individual contributor roles, users with these profiles may not be willing to spend more than one to two hours in meetings in a typical day since their primary task is to develop and test software, whereas a manager may be more willing to spend six to eight hours in meetings on a typical day.

It should be appreciated default rules in the system may be tuned specific to a particular user based on feedback received from the user in response to the recommended attendance modes and/or the attendance mode in which the user actually attended a particular meeting despite or regardless of the recommendation which may have been suggested.

As the use of the Internet allows users around the globe to collaborate in real-time without travelling, work on a single project often results in meetings being scheduled at less-than-ideal times for one or more users participating in the project. For example, a meeting scheduled in the middle of the day in India would occur in the middle of the night in the United States. For a user based in the U.S. to attend such a meeting would result in exhaustion and unreasonable levels of stress. As such, the computer system may be configured to identify a meeting occurring outside the user's typical work hours and to recommend the user select an attendance mode accordingly.

Similarly, the computer system may further be configured to generate a recommendation based on a location of a meeting associated with an invitation. Based on the user's calendar or normal work behavior, such as an office address, the computer system may be configured to recommend the user attend in person if convenient or remotely if the location is inconveniently far from where the user is expected to be at the time of the meeting.

At 1018, after generating a recommendation for an attendance mode, the recommendation may be provided to the invited user.

If the method 1000 is performed by a server or other computing device which is not directly operated by the user, the recommendation may be provided to the invited user by transmitting a message such as an email or other form of communication comprising a description of the recommendation. It should be appreciated that irrespective of whether the method 1000 is performed by a client application or a server, the recommendation can be provided in a user interface generated by the calendar application as in FIG. 9. In some embodiments, the recommendation may be appended to the invitation such that when the invitation is received by the user device of the user receiving the invitation the recommendation may be displayed in the invitation itself.

Figure 9A:

If the method 1000 is performed by an application executing on a user device of the user receiving the invitation, the application may generate an invitation 900 user interface including a recommendation 903 as illustrated in FIG. 9A.

The recommendation may be provided in the form of a user interface comprising information such as an identification of the event or events affected by the recommendation. For example, the user interface may contain information relating to the event invitation as well as information relating to conflicting events for which a recommendation has been generated.

The recommendation may include a description of the attendance mode recommended along with options for the user to either accept the recommended acceptance mode or to edit the acceptance mode before the user responds to the invitation.

The recommendation may also include recommendations for updating or otherwise changing an acceptance mode for one or more other events. For example, if the computer system recommends, based on the newly received invitation, that the user change the attendance mode for a previously accepted invitation, the recommendation may include a list of all events for which recommendations are being made and the user may accept or edit the recommended attendance mode for each either separately or in a batch.

For example, as illustrated in FIG. 9B, a recommendation user interface 950 may be displayed including a list of events, including the event associated with the newly received invitation, and may enable a user to set an attendance mode for each event simultaneously or individually.

In some embodiments, the computer system may be configured to generate a list of recommended attendance modes. The list of recommended attendance modes may be sorted based on a level of recommendation. For example, a most highly recommended attendance mode may be at the top of the list and a least recommended attendance mode may be at the bottom of the list. Such a list may enable a user to quickly view less than optimal attendance modes and select one if the user disagrees with the top recommended attendance mode.

In some embodiments, attendance modes may be represented by various graphical user interface icons, such as a different icon for a bot proxy mode, live stream mode, in-person attendance, mode, etc. The list of attendance modes may also be displayed in various colors, such as by displaying each attendance mode in a different color. For example, a highly recommended attendance mode may be bold or in green while a non-recommended attendance mode may be grayed out or in red.

A user having received the recommendation may be enabled through the user interface displaying the recommendation to respond to the recommendation by either accepting or editing the recommended attendance mode.

At 1021, after a user responds to the recommended attendance mode, the user's response may be received by the computer system. For example, a user may edit the attendance mode and thus not accept the recommendation. As such, in addition to selecting the attendance mode, the user can also be provided an edit box in which the user can describe the reason why he or she chose an attendance mode other than the mode recommended by the system. In some embodiments, a drop-down or other type of list may be provided such that a user may be enabled to select a reason. The reasons in the list may be associated with reason codes for the user to select regarding why he or she chose a different mode of attendance. In some embodiments, the reason provide by the user in the form of text can be processed using Natural Language Processing (NLP) technology to understand user preferences and feed them back into the system for future training purposes. In some embodiments, if the user does not directly respond to the recommended attendance mode before the meeting, the recommended mode of attendance may be automatically accepted on behalf of the user. For example, if the system recommended a post-meeting recording and the user did not respond, the system may automatically record the meeting and the recording may be shared with the user by the system when the meeting ends.

In some embodiments, a user's response may be used as feedback for training the neural network. For example, if the user accepts the recommended attendance mode, the neural network may be provided with positive feedback.

Similarly, because the user may not necessarily follow the recommendation of the computer system for a particular meeting and might override the recommendation by selecting another invite response option, the attendance mode selected by the user may be input to the neural network, along with information relating to the event and/or the user so that the neural network may be more likely to recommend the attendance mode selected by the user in similar future events. Similarly, if the user accepts the recommended attendance mode but later either changes the attendance mode or joins the meeting using a different attendance mode, the actually-used attendance mode may be used to train the neural network. In this way, future recommendations can be more accurate and closely matched to the individual user's preferences.

In some embodiments, a user may be provided an option to input a reason or comment for the user's attendance mode selection. Such information may also be used to train the system for future recommendations. For example, if a user comments that he or she is declining a certain meeting because the meeting is too late in the day, the system would learn that a particular meeting time is too late for the user and the system can recommend appropriate attendance mode for future meeting scheduled during that time.

Similarly, the system can learn about user's preferences for a mode of attendance for events occurring on a particular day. For example, consider a user attending two meetings in person on a first day and on the following day the user has six back-to-back meetings, and the user selects a remote attendance mode for the six back-to-back meetings. The computer system may be configured to learn from the user's selections and determine the user prefers a remote attendance mode when attending greater than two meetings in a day. In this way, the number of meetings that user is scheduled to attend in a day adds another input to the input data that the system uses to train the neural network.

At 1024, the method 1000 may end or may return to the beginning to respond to future event invitations for the user.

It should be appreciated that any number of combinations of the methods and systems described herein may be implemented to provide users efficient and user-friendly ways to attend events or to receive post-event information. The examples provided herein should not be considered as limiting the possible features in any way.

Embodiments of the present disclosure include a method comprising: method comprising: generating an electronic calendar item associated with an event; generating an invitation associated with the electronic calendar item, the invitation comprising: a first option associated with one or more of conditional attendance and a portion of desired attendance; and a second option associated with one or more of a type of attendance; sending the invitation; receiving a response to the invitation, the response comprising a selection associated with one or more of the first option and the second option; and based on the selection, performing one or more actions associated with the event.

Aspects of the above method include wherein the first option comprises one or more of a time range and a topic.

Aspects of the above method include wherein the second option comprises a request for one or more of a live transcription, a post-event transcription, a live recording, and a post-event recording.

Aspects of the above method include wherein the one or more actions are performed one or more of during and after the event.

Aspects of the above method include wherein the one or more actions comprise one or more of performing a live transcription and creating a recording of the event.

Aspects of the above method include wherein the one or more actions comprise editing one or more of a live transcription and a recording of the event.

Aspects of the above method include wherein in response to the first selection comprising a desired topic, the method comprises: detecting a mention of the topic during the event; and in response to the detection of the mention, sending a notification to the user.

Aspects of the above method include wherein in response to the first selection comprising a conditional acceptance based on attendance of a person, the method comprises: detecting the person is not attending the event; and in response to the detection of the person not attending the event, sending a follow-up invitation.

Aspects of the above method include wherein in response to the first selection comprising a desired topic and the second selection comprising a request for a post-event transcription, the method comprises: generating a transcription during the event; and after the event, editing the transcription to remove portions of the transcription not relating to the desired topic.

Aspects of the above method include wherein in response to the first selection comprising a desired topic and the second selection comprising a request for a live transcription, the method comprises: detecting a mention of the topic during the event; and in response to detecting the mention of the topic, generating a notification comprising a hyperlink directed to a location of a live transcription.

Embodiments include a method of generating user-specific recommendations, the method comprising: identifying an electronic invitation to an event; determining a user associated with the invitation; performing an analysis of the event based on the user; based on the analysis, generating a recommendation for an attendance mode; and presenting the recommendation for the attendance mode to the user.

Embodiments include a computer system comprising: a processor; and a computer-readable storage medium storing computer-readable instructions which, when executed by the processor, cause the processor to execute a method, the method comprising: identifying an electronic invitation to an event; determining a user associated with the invitation; performing an analysis of the event based on the user; based on the analysis, generating a recommendation for an attendance mode; and presenting the recommendation for the attendance mode to the user.

Embodiments include a computer program product comprising: a non-transitory computer-readable storage medium having computer-readable program code embodied therewith, the computer-readable program code configured, when executed by a processor of a first user device, to execute a method, the method comprising: identifying an electronic invitation to an event; determining a user associated with the invitation; performing an analysis of the event based on the user; based on the analysis, generating a recommendation for an attendance mode; and presenting the recommendation for the attendance mode to the user.

Aspects of the above methods include wherein the analysis comprises identifying one or more invitees to the event.

Aspects of the above methods include the method further comprising determining a relationship between the user and the one or more invitees.

Aspects of the above methods include wherein the analysis comprises identifying one or more topics associated with the event.

Aspects of the above methods include wherein the analysis comprises determining one or more other events are within a temporal proximity to the event.

Aspects of the above methods include wherein the analysis comprises inputting data associated with the event and data associated with the user into a neural network.

Aspects of the above methods include wherein the analysis comprises processing data associated with the event and data associated with the user using pre-programmed rules.

Aspects of the above methods include the method further comprising: determining the recommendation for the attendance mode was accepted by the user; and training the neural network based on the determination that the recommendation for the attendance mode was accepted by the user.

Aspects of the above methods include the method further comprising: determining the recommendation for the attendance mode was not accepted by the user; determining a different attendance mode was selected by the user; and training the neural network based on the determination that the recommendation for the attendance mode was not accepted by the user.

Examples of the processors as described herein may include, but are not limited to, at least one of Qualcomm® Snapdragon® 800, 810, 820, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, Rockchip RK3399 processor, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infrared data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method of generating user-specific recommendations, the method comprising:
    identifying an electronic invitation to an event;

determining a user associated with the electronic invitation;

performing an analysis of the event based on the user;

based on the analysis, determining a recommended attendance mode of a plurality of attendance modes, wherein the plurality of attendance modes comprise one or more of an in-person attendance, a remote attendance, a partial attendance, and a selective attendance; and presenting the recommended attendance mode to the user.

2. The method of claim 1, wherein the analysis comprises identifying one or more invitees to the event.

3. The method of claim 2, further comprising determining a relationship between the user and the one or more invitees.

4. The method of claim 1, wherein the analysis comprises identifying one or more topics associated with the event.

5. The method of claim 1, wherein the analysis comprises determining one or more other events are within a temporal proximity to the event.

6. The method of claim 1, wherein the analysis comprises inputting data associated with the event and data associated with the user into a neural network.

7. The method of claim 6, further comprising:
determining the recommended attendance mode was accepted by the user; and
training the neural network based on the determination that the recommended attendance mode was accepted by the user.

8. The method of claim 6, further comprising:
determining the recommended attendance mode was not accepted by the user;
determining a different attendance mode was selected by the user; and
training the neural network based on the determination that the recommended attendance mode was not accepted by the user.

9. The method of claim 8, further comprising:
receiving text comprising a reason provided by the user describing why the recommended attendance mode was or was not accepted;
analyzing the text comprising the reason; and
training the neural network based on the analysis of the text comprising the reason.

10. The method of claim 1, wherein the analysis comprises determining a number of users invited to the event.

11. A computer system comprising:
a processor; and
a computer-readable storage medium storing computer-readable instructions which, when executed by the processor, cause the processor to execute a method, the method comprising:
identifying an electronic invitation to an event;
determining a user associated with the electronic invitation;
performing an analysis of the event based on the user;
based on the analysis, determining a recommended attendance mode of a plurality of attendance modes, wherein the plurality of attendance modes comprise one or more of an in-person attendance, a remote attendance, a partial attendance, and a selective attendance; and
presenting the recommended attendance mode to the user.

12. The computer system of claim 11, wherein the analysis comprises identifying one or more invitees to the event.

13. The computer system of claim 12, wherein the method further comprises determining a relationship between the user and the one or more invitees.

14. The computer system of claim 11, wherein the analysis comprises identifying one or more topics associated with the event.

15. The computer system of claim 11, wherein the analysis comprises determining one or more other events are within a temporal proximity to the event.

16. The computer system of claim 11, wherein the analysis comprises inputting data associated with the event and data associated with the user into a neural network.

17. The computer system of claim 16, wherein the method further comprises:
determining the recommended attendance mode was accepted by the user; and
training the neural network based on the determination that the recommended attendance mode was accepted by the user.

18. The computer system of claim 16, wherein the method further comprises:
determining the recommended attendance mode was not accepted by the user;
determining a different attendance mode was selected by the user; and
training the neural network based on the determination that the recommended attendance mode was not accepted by the user.

19. A computer program product comprising:
a non-transitory computer-readable storage medium having computer-readable program code embodied therewith, the computer-readable program code configured, when executed by a processor of a first user device, to execute a method, the method comprising:
identifying an electronic invitation to an event;
determining a user associated with the electronic invitation;
performing an analysis of the event based on the user;
based on the analysis, determining a recommended attendance mode of a plurality of attendance modes, wherein the plurality of attendance modes comprise one or more of an in-person attendance, a remote attendance, a partial attendance, and a selective attendance; and
presenting the recommended attendance mode to the user.

20. The computer program product of claim 19, wherein the analysis comprises identifying one or more invitees to the event.

* * * * *